Sheet 1. 2 Sheets.
Willard & Ross.
Mower.
№ 1778 Reissued Sep. 27, 1864.
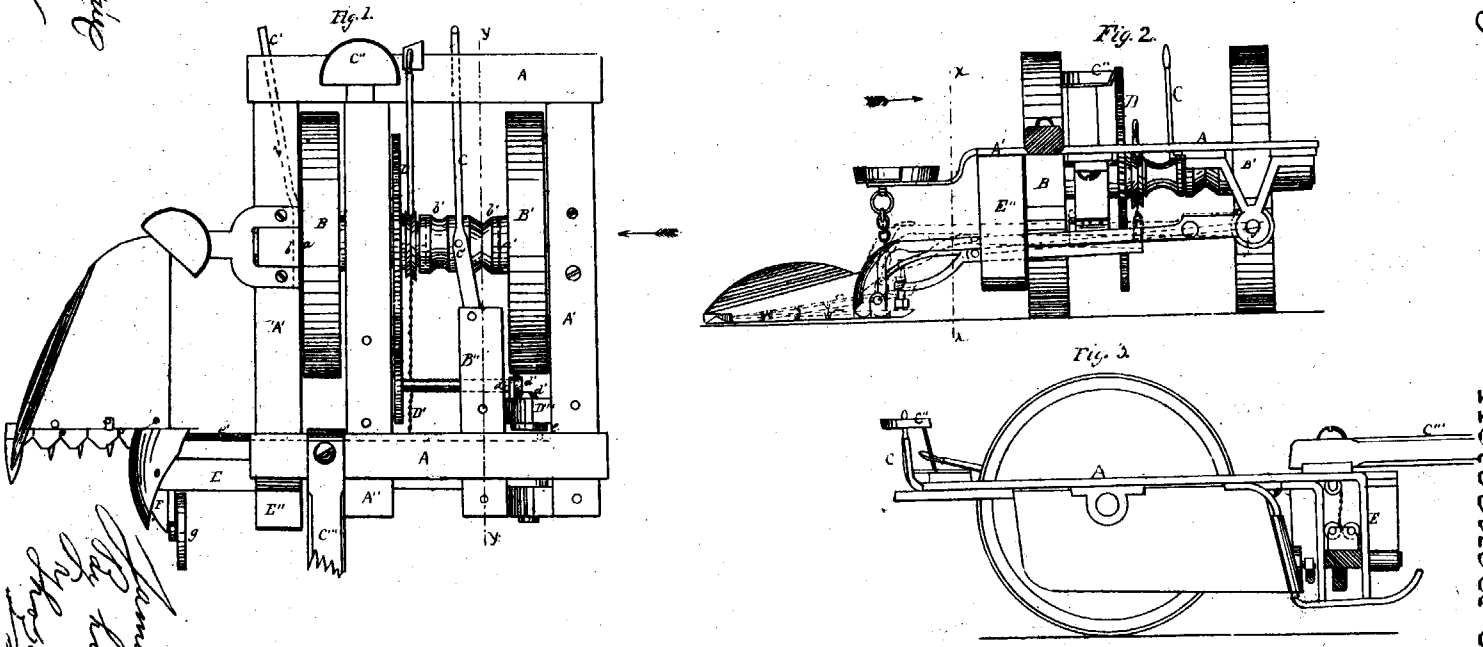
Witnesses.
J. Henry Stiles
Elijah D. Dodge
Inventor:
James A. Sapton
By his Attorney
Thos. H. Dodge Sheet 2. 2 Sheets.
Willard & Ross.
Mower.
No 1778 Reissued Sep. 27, 1864.
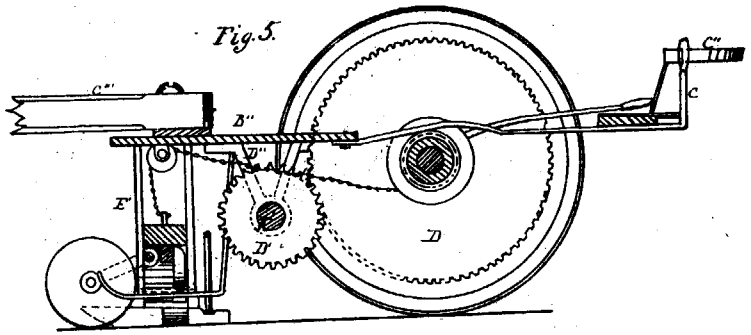
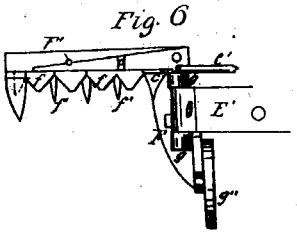
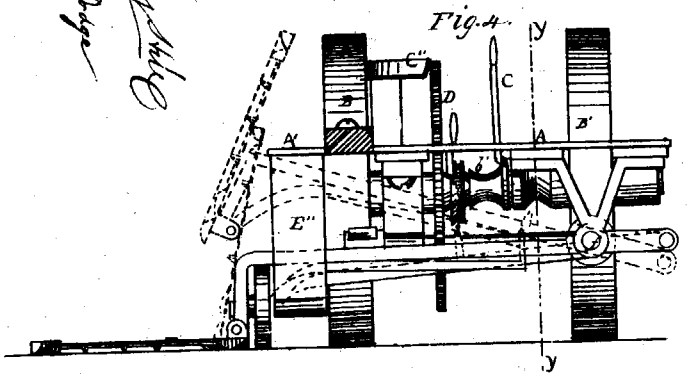
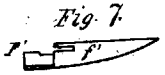
Witnesses:
J. Henry Stile
Eliza D. Dodge
Inventor:
James A. Dayton,
By his Attorney
Thos. H. Dodge
3

UNITED STATES PATENT OFFICE.

JAMES A. SAXTON, OF CANTON, OHIO, ASSIGNEE, BY MESNE ASSIGNMENTS, OF HOSEA WILLARD AND ROBT. ROSS.

IMPROVEMENT IN HARVESTERS.

Specification forming part of Letters Patent No. 18,562, dated November 3, 1857; Reissue No. 1,778, dated September 27, 1864.

*To all whom it may concern:*

Be it known that HOSEA WILLARD, of Vergennes, in the county of Addison and State of Vermont, and ROBERT ROSS, formerly of same place, but now residing at St. Albans, in the county of Franklin, in said State, invented certain new and useful Improvements in Grain and Grass Harvesting Machines, of which the following is a full, clear, and exact description, reference being had to the accompanying drawings, forming part of this specification, and in which—

Figure 1 is a plan or top view, showing one mode of applying said improvements when the machine is to be used as a reaper. Fig. 2 represents a front view of Fig. 1 with the leading-wheel removed to show the parts in rear of it more fully, the coupling-arm, finger-beam, and platform being shown in different positions to illustrate the flexible connection of the finger-beam with the machine. Fig. 3 represents a section and side view on line *x x*, Fig. 2, when the parts are in the positon shown in black lines. Fig. 4 represents in black lines a front view of the machine when arranged for mowing, and in blue and red lines two of the different positions which the finger-beam and cutting apparatus are made to assume when being prepared or folded for transportation. Fig. 5 represents a section on lines *y y*, Figs. 1 and 4, when the machine is arranged for mowing, as shown in black lines, Fig. 4. Fig. 6 represents a plan or top view of finger bar or beam F′, shoe F, leading-wheel *g″*, and part of the coupling-arm or finger-bar extension-piece E′; and Fig. 7 represents a side view of one of the fingers and an end or cross section of the finger bar or beam, showing how a part of the finger is made to rise up by the front edge of the bar to keep the cutter-bar from working forward.

The side of the machine which runs next to the standing grain I call the "inside," and that which runs next to the cut grass or grain I call the "outside."

In the accompanying drawings the main frame, which is of rectangular form. is represented by the letters A A A′ A′. To the under side of the parts A′ A′ are fastened the bearings of the main shaft or journal of the driving and supporting wheels B B′. To the inner hub of the latter is fastened a ratchet wheel or device, *a′*, while a similar ratchet device, *a′*, is fastened to the outer hub or side of wheel B. Wheels B B′, with their hub-ratchets, are fitted loosely on shaft X. A sliding ratchet wheel or device, *b′*, works on shaft X, and is so conected therewith as to be revolved when said shaft revolves, but is susceptible of a lateral movement, so that it can be moved in and out of action with ratchet *a′* by means of pin *c′* in lever C, whose front end is pivoted to the under side of piece B″, fastened to the front of the frame. Pin *c′* fits into a groove turned in the part *b′*, so that the part *b′* operates like a sliding revolving clutch. A similar ratchet or clutch, *b*, is fitted to be worked by lever C′ on the outside of wheel B.

C″ is the driver's seat, which is fastened to the rear of the main frame, and in such a position as that levers C and C′ are both within his reach. As the machine is drawn forward by tongue C‴ (shown in section) wheels B B′ revolve, and when both or either of the clutches *b b′* are in action with their respective ratchets *a a′* shaft X is caused to revolve, together with cog-wheel D, fastened thereto, and which gears into cog-wheel D′ on a shaft, X′, supported at one end by a hanger, D″, depending from piece A″, and at the other in a projection *d* from hanger D‴, in which the short crank-shaft turns, the latter having on its rear end a bevel-gear, *d″*, which is operated by bevel-gear *d′* on the end of shaft X′.

On the front end of the crank-shaft is fitted a balance-wheel, *e*, with a crank-pin, upon which is placed the outer end of the pitman *e′*, which gives motion to the cutter-bar *e″*, to which are attached teeth *f*, which work as they vibrate through slotted open fingers *f′*.

The improvements which form the subject of this patent relate to that class of mowing-machines in which provision is made to allow the finger-beam to have an up-and-down motion to conform to the irregularities of the ground independent, or nearly so, of the up-and-down motion of the main frame, and consist, first, in combining with the heel of the finger-beam, or the shoe which supports it, a finger-bar extension-piece or coupling-arm, so constructed and connected with the main frame as that the whole or only the outer end of the finger-beam can rise up or fall down without necessarily requiring the front of the frame to rise or fall at the same time, in combination with giving to said finger-bar extension-piece or coupling-arm a "friction-support" at or near its inner end—that is, the end next to the finger-beam—thus dispensing with the use of hinged braces; second, in combining with the finger-bar extension-piece or coupling-arm, to which the shoe which supports the heel of the finger-beam is connected, a "metallic loop" for allowing an upward-and-downward motion to the finger-beam, while at the same time giving said extension-piece or coupling a support to prevent it from being hoisted back or forward when the machine is in operation or being backed; third, in the arrangement of said finger-bar extension-piece or coupling-arm in such a manner as respects the main frame that one of its ends will be connected to the front outer corner of the main frame, while the other end projects out under or by the front inner corner of the main frame, in combination with giving a friction-support to said finger-bar extension-piece or coupling-arm to prevent it from twisting back when the machine is in use.

In the accompanying drawings, F′ represents the finger-beam or bar, the heel end of which is connected firmly to a shoe, F, to which one end of the finger-bar extension-piece or coupling-arm E′ is connected—in this instance by a hinge or joint—the other end of E′ being connected to the outer front corner of the main frame by means of a bracket, E, and joint *f″*.

To the inner front corner of the main frame a metallic loop, E″, is attached, and through which the finger-bar extension-piece or coupling-arm E′ passes, after which it is connected to shoe F by a joint, as seen at *g g*. As the machine is drawn forward it carries forward the extension or coupling piece E′, and that in its turn carries forward the finger-beam, to which are attached the fingers *f′*, through which cutters *f* on the cutter-bar *e″* work. As the machine advances the finger-beam is free to rise and fall bodily, or at the outer end, to conform to the inequalities of the ground, by reason of the yielding nature of its connection with the main frame.

To give the finger-bar extension-piece or coupling-arm proper support and prevent it from being twisted back when the machine is cutting or in operation, also to prevent it from being twisted forward when the machine is backed, and yet dispense with the use of hinged braces, a friction-support is employed. It is formed by loop E″, which passes on each side of the extension-piece or coupling-arm, so that while the said finger-bar extension-piece or coupling-arm is free to rise and fall it is also well braced, or prevented from being twisted back when the machine is advanced, or from being twisted forward when the machine is backed, thus keeping the finger beam or bar to which it is connected at all times in its proper and relative position at the side of the machine, and that, too, without preventing its rising-and-falling motion, to enable the cutters to sever the stalks of grass close down to the ground when the machine is in operation, even on rough or uneven ground.

For a more full description of the various parts of the machine shown in the drawings reference can be had to other patented divisions of even date herewith, only so much of the machine having been described in this specification as was deemed necessary to illustrate one mode of applying the improvements which form the subject-matter of this patent to practical use.

What is claimed, therefore, as the invention of said WILLARD and ROSS under this patent is—

1. The combination, with the heel of the finger-beam or the shoe which supports it, of a yielding finger-bar, hinged extension-piece or coupling-arm, and a friction-support, substantially as and for the purposes herein described.

2. The combination of a metallic loop with the shoe which supports the heel of the finger bar or beam and the finger-bar extension-piece or coupling, whereby the use of a hinged brace is obviated, while the heel of the finger bar or beam is allowed to yield up and down to conform to the inequalities of the ground, and at the same time is kept from being twisted back when the machine is in operation or forward when the machine is backed, substantially as and for the purposes herein described.

3. The arrangement of said finger-bar extension-piece or yielding connection in such a manner as respects the main frame that one of its ends will be connected to the front outer corner of the main frame, while the other end projects out by the inner front corner of the main frame, there to connect with the shoe which supports the heel of the finger bar or beam, in combination with a friction-support, for the purposes as stated, substantially as and for the purposes described.

In testimony whereof I have hereunto subscribed my name.

JAMES A. SAXTON.

In presence of—
GEO. E. BALDWIN,
S. SURBURG.